United States Patent [19]

Lemelson

[11] Patent Number: 4,646,172
[45] Date of Patent: Feb. 24, 1987

[54] VIDEO SYSTEM AND METHOD

[76] Inventor: Jerome H. Lemelson, 48 Parkside Dr., Princeton, N.J. 08540

[21] Appl. No.: 569,451

[22] Filed: Jan. 9, 1984

Related U.S. Application Data

[63] Continuation-in-part of Ser. No. 222,130, Jan. 2, 1981, abandoned, which is a continuation-in-part of Ser. No. 158,286, Jun. 10, 1980, which is a continuation-in-part of Ser. No. 225,173, Aug. 27, 1962, Pat. No. 4,213,163, which is a continuation-in-part of Ser. No. 668,348, Jun. 27, 1957, Pat. No. 3,051,777.

[51] Int. Cl.$^4$ .............................. H04N 5/782
[52] U.S. Cl. ............................ 360/33.1; 360/19.1
[58] Field of Search ................ 360/10.1, 10.2, 10.3, 360/11.1, 14.1, 14.2, 14.3, 35.1, 33.1, 19.1; 350/310, 311, 335, 342, 343, 22; 364/900

[56] References Cited

U.S. PATENT DOCUMENTS

| | | | |
|---|---|---|---|
| 3,051,777 | 8/1962 | Lemelson | 360/14.3 |
| 3,712,956 | 1/1973 | Lemelson | 360/35.1 |
| 3,748,381 | 7/1973 | Strobele et al. | 360/14.1 |
| 3,766,528 | 10/1973 | Ichida | 364/900 |
| 3,784,736 | 1/1974 | Norak | 358/335 |
| 3,991,265 | 11/1976 | Fukuda et al. | 360/19.1 |
| 4,189,743 | 2/1980 | Schure et al. | 358/310 |
| 4,258,385 | 3/1981 | Greenberg et al. | 358/22 |
| 4,295,154 | 10/1981 | Hata et al. | 360/19.1 |
| 4,305,131 | 12/1981 | Best | 358/342 |

Primary Examiner—Donald McElheny, Jr.
Attorney, Agent, or Firm—Neil F. Markva

[57] ABSTRACT

An audio-visual system and method for generating video information in the form of lines of alpha-numeric characters, graphical and certain forms of animation information from recordings thereof together with audio information in the form of speech, music and other sounds associated with the visual or video information. Recordings of such two forms of information are provided on a record member, such as a magnetic tape disposed in a cartridge or cassette, which tape is driven at constant speed past a plurality of pickup transducers including one which is operable to reproduce the audio recordings from a first track of the tape and a second which is operable to reproduce digital video recordings of such lines of characters, graphical and animated cartoon information. In one form, the record member is driven at constant speed while audio recordings and digital video recordings are reproduced continuously from the tape. In another form, the tape is intermittently driven past reproduction transducers under the control of a timer to intermittently generate both audio and video digital signals which signals are recorded in a buffer, such as a rotating disc or drum or other form of memory from which such signals may be repeatedly reproduced at a rate whereby they may be utilized to generate still images on the screen of a cathode ray tube and/or images composed of still picture phenomena and moving phenomena. Where the record member is intermittently operated for reproducing therefrom, digital signals are reproduced at high speed and applied to a buffer memory from which they are reproduced at a lower speed in a manner to generate sounds of words accompanying the generation of video image information.

20 Claims, 1 Drawing Figure

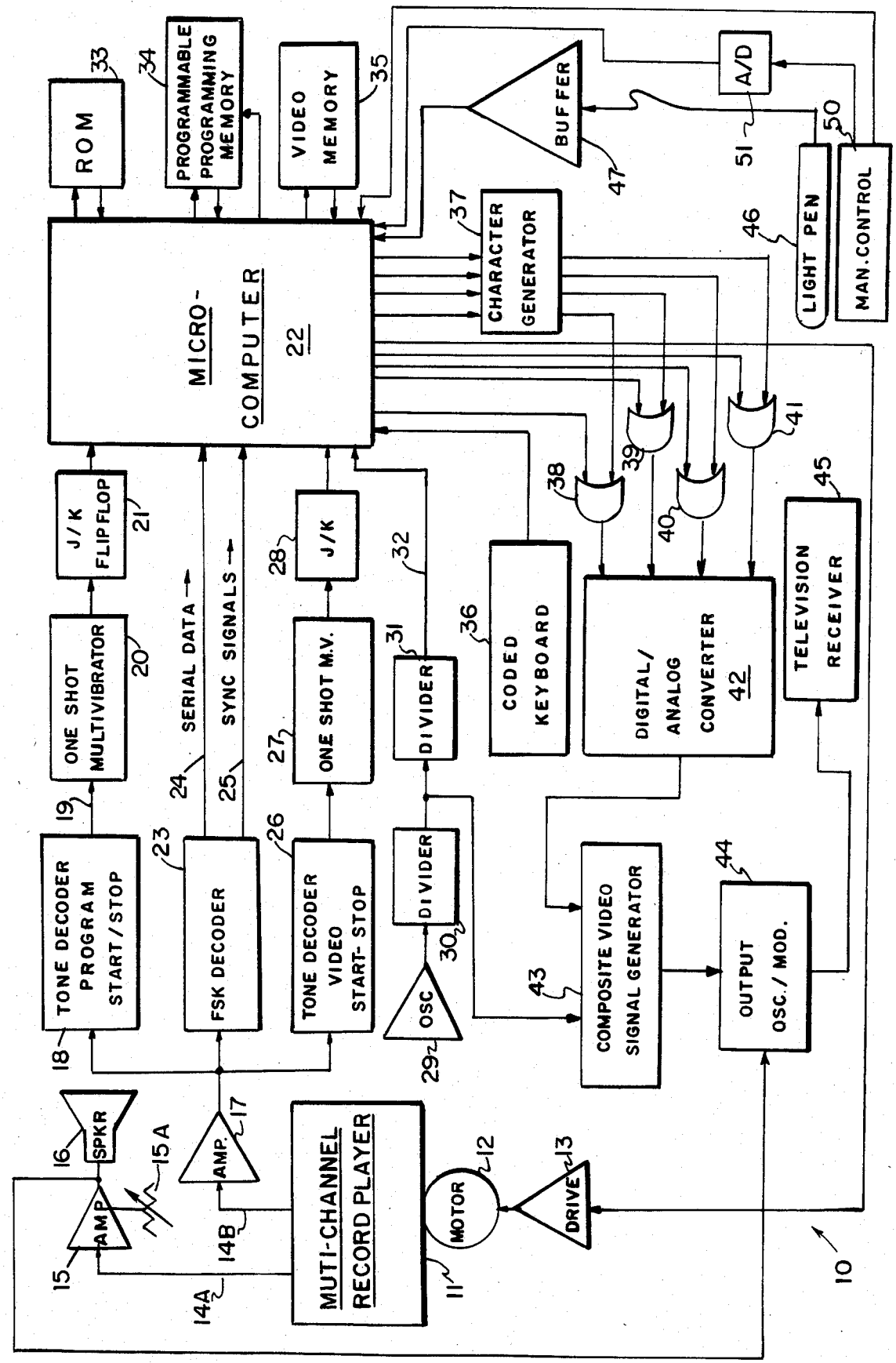

VIDEO SYSTEM AND METHOD

RELATED APPLICATIONS

This is a continuation-in-part of application Ser. No. 222,130 filed Jan. 2, 1981, now abandoned, which is a continuation-in-part of application Ser. No. 158,286 filed June 10, 1980, which is a continuation-in-part of application Ser. No. 225,173 filed Aug. 27, 1962, now U.S. Pat. No. 4,213,163 which is a continuation-in-part of application Ser. No. 668,348, filed June 27, 1957, now U.S. Pat. No. 3,051,777.

SUMMARY OF THE INVENTION

This invention relates to an audio-visual system and method having applications for performing functions such as entertaining, educational and training functions. In particular, the system employs a record member and a reader or reproduction unit for both audio and video signals recorded in or on such record member. In a preferred form, the record member is a magnetic tape wound for endless tape movement or reel-to-reel movement in a cartridge or cassette and contains at least two record channels, on one of which is recorded audio recordings of speech, music and other sounds and on the other of which channels is recorded video information in the form of digital video signals which, when reproduced therefrom, are automatically recorded in a microelectronic memory defining an updatable refresh buffer for retaining images or portions of images on the screen of a television receiver, such as one employing a cathode ray tube, for as long as the image information is contained within such memory. In a particular form, the video recording in the memory is constantly updated with additional digital information added thereto while previously recorded information defining respective portions of the image field generated from such information, may be automatically removed from the memory under the control of signals reproduced from the record memory or generated by a computer receiving and analyzing the record member contained signal.

As a result of utilizing such a technique of recording, buffering and controlling the write beam of a television receiver such as a cathode ray tube, by means of signals reproduced from a record member and applied to an erasible memory [such as an EPROM microelectronic circuit], a system is derived which is low in cost, relatively simple in operation, applicable in a conventional television receiver and which may be utilized for training and educational purposes and for entertaining the person or persons viewing the receiver.

Accordingly it is a primary object of this invention to provide a new and improved apparatus and method for recording, reproducing and generating both audio and visual information.

Another object is to provide a system and method for generating character and graphical information on the viewing screen of a television receiver as well as audio information describing or related to such visual information from recordings provided on a record member which are reproduced therefrom and applied to a repeat buffer for generating, when repeatedly reproduced from such buffer, still and animated images on the viewing screen of a cathode ray tube or similar video display.

Another object is to provide a system and method for recording information in the form of signals generated by reproducing same from a record member and applying such signals to an erasable programmable read only memory or EPROM.

Another object is to provide an audio-visual display, entertainment and demonstration system which is relatively simple in structure and operation and which does not require a complex mechanism, such as a video tape recorder and reproduction unit.

Another object is to provide an audio-visual system for generating video information on the viewing screen of a cathode ray tube and audio information associated with such video information whereby an audio cassette tape recorder may be utilized to generate both of such forms of information at low cost.

Another object is to provide an audio visual system employing a conventional television receiver as a display, which system is capable of human interaction with the displays generated to provide game playing and educational functions.

Another object is to provide an electronic system employing a television receiver and display as an image generating medium and digital electrical signals recorded in one or more memories of a microelectronic processor or microcomputer for both controlling the generation of images on the screen of such television receiver, player or student generated variations in such images and a variety of interactive functions which may be employed in a variety of games, educational and instruction operations.

Another object is to provide a low cost microelectronic system for controlling the generation of images on a cathode ray tube and varying the content and locations of image information.

Another object is to provide an electronically controlled system for presenting image information to a viewer of a television receiver, which system is low in cost, simple in operation and function and easy to operate.

With the above and such other objects in view as may hereafter more fully appear, the invention consists of the novel constructions, combinations and arrangements of parts and methods for displaying animated and still information and manipulating same as will be more fully described and illustrated but it is to be understood that changes, variations and modifications may be resorted to which fall within the scope of the invention as claimed.

The drawing illustrates a system for generating both still and animated images on the viewing screen of a television receiver from recordings provided in a memory such as a magnetic tape of a record player and from the selective operation of one or more input devices but an operator such as a student or game player.

In FIG. 1 is shown an electronic system 10 which is operable to generate visual presentations of information, such as characters, words, numbers and other indicia as well as simulated cartoon presentations on a video viewing screen, such as a cathode ray tube, together with accompanying audio playback of recordings on a record member, such as a magnetic tape, wherein such video recordings are in the form of digital recordings and the playback mechanism is relatively simple. A record playback unit 11 is employed which is shown as a magnetic tape cassette player of relatively simple structure with a tape drive speed in the range of ½"-2" per second, a two-channel tape player being illustrated although other forms of record playing units are contemplated, such as a magnetic card reader or a single-channel magnetic tape record player. A constant speed motor 12, employed to drive the tape in the cassette in response to signals generated by a computer or microprocessor 22 operating through an electronic driver 13 for the motor 12, results in the output of audio signals of speech, music and other sounds on a line 14A to an audio amplifier 15 and a speaker 16. Manual volume control 15A is employed to control the intensity of the signal on the output of the amplifier. Also output from the multiple-channel record player 11 on a second line 14B, are digital video signals which are passed through a video amplifier 17.

The output of video amplifier 17 passes to a tone decoder 18, an FSK decoder 23, and a second tone decoder 26. Start-stop signals are detected by decoder 18, passed on an output 19 to a one-shot (Schmidt) multi-vibrator 20 or the like, the pulse output of which sets a J/K flip-flop control 21 which passes its signal to a circuit of a computer 22, such as a microcomputer or microprocessor. The signal output of the flip-flop 21, which is an indication that the subsequent sequence of signals generated by the record player 11 will be general programming instruction signals for the microcomputer 22 and such programming signals are decoded by the FSK (frequency shift keying) decoder 23, it being noted that other signal coding and decoding means known in the art may also be employed, such as digital code and tone coding and decoding circuits.

The decoded program signals, together with accompanying data synchronization signals, are thus input to the microcomputer 22 through which they pass to a programming, programmable memory 34 whenever flip-flop circuit 21 is activated as described. Such programming of the microcomputer 22 may include control instructions for a particular game, programming or instructions which may later be used to generate and determine a fixed video field, such as a background display of a playing field or board or other background information. General fixed operating instructions are contained in a read-only memory (ROM) 33 which is queried by the microcomputer 22, when needed to perform the functions described herein.

In an example of the operation of the system 10, an end of programming instruction set is derived as signals generated on the output 14B of the record player 11 and may be indicated as a second tone of the same frequency as that which indicated the beginning of the instruction set. Such second tone is amplified by amplifier 17 and is detected by decoder 18, conditioned by the one-shot multi-vibrator 20 which serves to toggle the flip-flop 21 to its inactive state, thereby signalling the microcomputer 22 that the instruction set just generated is complete.

Following such end of programming signal and reproduced from the same channel of the record player 11, may be digitally encoded signals indicative of a changing video display which may be read in the following manner. Preceding the actual picture information, a tone burst of a frequency different from that which was used for indicating programming sequences, is reproduced from the video record track of the record member. Such tone burst is amplified by amplifier 17 and its frequency is recognized by a tone decoder 26, the output of which is conditioned by a one-shot multi-vibrator 27, of the type described, the output of which in turn sets a J/K flip-flop 28, the output signal of which flip-flop is an indication to the microcomputer 22 that the following data and sync signals decoded by FSK decoder 23 will be video control information. Such signals which follow are decoded in a like manner to that previously described for decoding the programming signals.

Simultaneously recorded with such video information on either the same or an adjacent channel of the tape or record member is a sound signal such as a voice generated signal, sound effects or music signal, which is generated on the output 14A of the record player, amplified by amplifier 15 and output therefrom to the loudspeaker 16 for conversion to audio sounds of words, music or other sounds.

In order to assure proper operation of the system 10 and to derive output synchronization signals, such system contains a stable, accurate oscillator 29 such as a crystal controlled oscillator, the output of which is divided down to the proper operation frequency by respective frequency dividers 30 and 31, wherein the output of the latter divider is passed to the microcomputer 22.

In accordance with the fixed programming instructions of the read-only memory 33 and the program instructions recorded in a second memory 34 connected to inputs of the microcomputer 22, the microcomputer 22 generates a digital version of the background video information to be displayed and enters such digital information into a programmable video memory 35, the size of which will be dependent upon such factors as image resolution and image structure. As such encoded picture information is input to the microcomputer 22 from the FSK decoder 23, at least a portion thereof is gated thereby to the video memory 35 which serves to change or reprogram the information recorded therein and thus provides a signal means for changing the video display with time so as to provide changing information displayed, changes in color and animation effects including such effects as the simulation of motion of a portion of the display, changes in facial content and expression, simulated mouth and facial movements, etc. which may be synchronized to the sounds produced.

Video memory 35 is continuously read by the microcomputer 22 at an appropriate rate, such as 30 times per second, to generate digitally encoded signal information which is transferred by means by OR gates 38, 39, 40 and 41, which are in respective parallel outputs of a character signal generator 37. The latter may be used to generate alphabetical and/or numerical information to be displayed in accordance with instructions generated on outputs of the microprocessor or microcomputer 22 received from any of its memories or in direct response to the manual operation of the keys of a digitally encoded keyboard 36. The keyboard 36 may be used to enter separate programming instructions, responses to manual or otherwise generated prompting of system 10, such as in the playing of games or in a mode of operation where an operator interacts with the system by means of a manual or otherwise operated device such as a voice command input, light pen 46, etc.

A digital-to-analog converter 42 forms one input to a composite video signal generator 43. The other input to the video signal generator 43 is composed of synchronization frequency signals derived from divider 30 which is connected to an output of an oscillator 29. The output of the video composite signal generator 43 is in a form suitable for display on a conventional television receiver or video monitor connected to said receiver 45. The output of the composite video signal generator 43 is connected to an oscillator-video modulator 44 for direct application to the antenna terminals of a conventional television receiver 45.

Also illustrated in the drawing is a light pen 46 which may be used as an alternative or auxiliary input device for the keyboard 36 and as a device which may be used in the playing of video games. Such light pen 46 has an output which is connected to a buffer 47, the output of which is connected to a suitable input of the microcomputer 22.

Also illustrated in the drawing is a game controller 50, which may be a manually operated device such as a toggle switch, a number of toggle switches operated by both hands and/or a so called Joy stick controller which generate analog control signals which are passed to an analog-to-digital converter 51, the output of which is connected to an input to the microcomputer 22 which performs processing with respect to such signals and generates output signals for appropriately controlling the character generator 37 and the composite video signal generator 43 in accordance with the signals recorded in the memories 33, 34 and 35 so as to properly affect same to permit the playing of games displayed on the display screen of a television receiver 45.

The light pen 46 may be operable to be manually guided across a selected printed bar code provided on a card or sheet of paper as one of a plurality of such codes for generating selected electrical codes to be applied to the buffer 47 for application therefrom through the microcomputer 22 either directly to the character generator 37 for generating selected characters on the display screen of the television receiver 45, to the drive 13 of motor 12 for controlling motor operation, or to any of the memories 34 or 35 for modifying or changing the information recorded therein and the image displayed. The computer 22 receives the output of buffer 47 and, depending on the content of the codes generated by the light pen 46, gates the image or control information generated by the light pen to the selected output of the computer.

Modes of operation of the system 10 are noted as follows:

1. Record player 11 may operate continuously to generate digital video signals capable of completing a still video picture or display on the screen of a cathode ray tube, sometimes called a full-frame video picture signal, which may be suddenly displayed and suddenly replaced with a new frame of information.

2. Record player 11 may be operated continuously, and as it operates, portions of the frame displayed changing content and position to provide such effects an animation, etc.

3. Both continuous and intermittent forms of display as defined above together with accompanying audio playback is effected as the record member is read.

4. The record player 11 operates intermittently and is controlled to start and/or stop by manual operation of selected keys of the keyboard or by means of signals generated from other programming means, such as the microcomputer 22 and/or in response to the selective operation of the light pen 46 and/or other input devices.

5. In yet another form, game or teaching sequences of video and audio playback may be generated wherein the cassette player 11 is operated in response to the manual operation of a game controller 50 and/or the keyboard 36, the signals generated thereby being output to the microcomputer 22 and controlled by signals generated by the memories 33 and 34.

6. In still another form, the record playback unit 11 operates continuously as a player operates the keyboard 36, light pen 46, game controller 50 or other device.

7. Signals recorded on the record member or tape read by the record player pick-up or transducer adapted to reproduce control signals therefrom may be applied either directly or through suitable gating means of the microprocessor or computer 22 to effect controlled stopping of the motor driving the record member, denoted 12, until such motor is again started by a signal generated by the microprocessor or the selective operation of a key of the keyboard 36 or the controller 50. In such a mode of operation, proper answers to questions effected by proper operation of the keyboard or the speaking of proper words into a microphone forming part of the controller 50 or an auxilliary voice input controller, may be operable to effect such variations in the image displayed by the television receiver as the changing of an entire image field to display that which is next recorded on the record member being read, the partial changing of the image field such as one or more lines of characters or other portion(s) of the display as effected by signals generated from any of the computer memories under the control of such computer and/or the selective generation of audio information from the record player and/or a memory such as a microelectronic synthetic speech signal generating memory and/or one operable to record digital speech signals reproduced from the record member of the record player 11.

8. For record keeping purposes, such as the scoring of a game, the scoring of a test or quiz or the measurement of other human capabilities associated with interaction between the keyboard 36, light pen 46, controller 50, a voice input means (not shown) or other means, recording of signals generated on an output of the microcomputer 22 or any of the other interactive devices shown and described above may be effected in an auxiliary memory or on the record member of the record player 11. For example, such signals may be recorded over or with the video signals reproduced from the video record track thereof or may be recorded on an auxiliary track adjacent thereto permitting the user of the system to record his own picture information for further use.

9. All or certain of the video signals recorded in and reproduced from the record member or tape of the record player 11 may comprise so called slow scan video picture signals derived from the outputs of one or more television cameras and recorded either in the analog form in which they are generated, in digital form derived from an analog-to-digital converter in the output of the television camera or in a modified analog or digital form derived from a signal processor which is operable to make certain variations in the video picture signals either in its analog or its digital form to either vary the manner in which the picture is presented to the viewer, its color or to change the background content thereof. In such a system, the slow scan video signal may be generated from a digital memory after receiving such signal at the frequency it is generated by the television camera employed to generate same and operable to reproduce the same signal thereafter at a slower scanning rate in the audio frequency range to permit the slower operating frequency of the recorder-player 11 to generate the video signal for its proper presentation to the memory 35 of the microcomputer 22.

10. Recordings provided on the record member read by the record playback device 11 may include erasure control signals which, when reproduced therefrom in sequence with the reproduction of respective video picture signals and applied to the computer 22 effect the controlled erasure of complete full frame video signals recorded in the erasable memory 35 or selected portions of such video signal recording in accordance with the commands defined by the characteristics of the control signals reproduced.

11. Recordings provided on the record memory read by the record playback device 11 may also include signal recordings of command signals operable when reproduced therefrom in sequence with the video signal recordings scanned to reproduce the video signals applied to the erasable memory may be used to cause the selective reproduction of signals from such erasable memory to the exclusion of other recordings for causing animation effects to be generated on the viewing screen of the video receiver such as the effects of movement of figures, facial components or other portions of the image(s) generated, the enlargement of portions of the image(s) generated, the disappearance of select portions of the image(s) displayed, the change of color, shading, enhancement or other variations in the images generated. One or more additional erasable memories may be provided to receive all or portions of the video signals recorded in the video memory 35 and provide image generating output signals when so controlled and energized.

12. Recordings provided on the record memory may also include recordings of command control signals for controlling operation and playback of digital speech signals from a synthetic speech generator or other form of synthetic speech memory operable to generate digital signals of speech of words, phrases and sentences associated with the video information generated and displayed.

13. The television receiver 45 may include a display such as a cathode ray tube having a viewing screen which is sensitive to touch wherein portions of such viewing screen when touched with the finger change in image content, become enlarged or decreased in size or become erased by means of feedback signals generated opn sensing such touching of the screen and applied to the computer 22 which processes the signals and effects changes in the signals recorded in the memories 34 and 35 for effecting such change in content of the image displayed.

It should be understood with respect to all of the embodiments of the invention described above and illustrated in the drawing that power supplies having the correct polarities and magnitudes are provided where not indicated in the drawing so as to supply proper electrical energy for operating the various illustrated components and circuits as described in the specification.

What is claimed is:

1. An audio-visual system comprising in combination:
   (a) a record member containing audio and video recordings and a record playback means for reading said audio and video recordings from said record member,
   (b) said playback means including means for generating respective audio and video signals from such recordings,
   (c) a digital computer and an erasable memory for receiving and recording signals reproduced by said record playback means from said record member,
   (d) said digital computer being operable to control said record playback means to cause it to selectively reproduce signals recorded in said record member, and record same in said erasable memory,
   (e) a video receiver having a viewing screen and image generating and retention means therefor requiring refresh scanning to maintain images on said viewing screen,
   (f) said video receiver being operable for receiving video signals reproduced from said erasable memory for generating still images on said viewing screen which change with time and are defined by a plurality of video signals reproduced from said record member and recorded in said erasable memory,
   (g) means for causing signals recorded in said erasable memory to be generated at a fixed frequency and to be applied as they are generated to said video receiver so as to cause said video receiver to generate and retain respective still images on said viewing screen,
   (h) means for reproducing audio signals from said record playback reading means and transducing said audio signals to sounds of speech in synchronization with the generation of images generated on said viewing screen of said video receiver as said record playback reading means reproduces signals recorded on said record member,
   (i) said digital computer being operatively connected and operable (1) to control the operation of said record playback means so as to cause said record playback means to selectively play back recordings reproduced from said record member and (2) to selectively generate video and audio signals therefrom and control the application of said video signals to cause said viewing screen of said video receiver to sequentially display still images in sequence and to transduce.

2. An audio-visual system in accordance with claim 1 wherein said video recordings on said record member are analog video picture signals derived from the output of a television camera and means for converting said video picture signals to digital form for recording in said erasable memory as digital video signals.

3. An audio-visual system in accordance with claim 2 wherein said video recordings on said record member are slow-scan frame video picture signals derived from the output of a television camera and said record playback means includes a magnetic tape reader and means for driving a magnetic tape during the playback of signals recorded thereon at such a constant speed to permit said audio recordings recorded thereon to be reproduced therefrom, amplified and applied to a speaker for generating said sounds of speech.

4. A system in accordance with claim 2 including digital-to-analog conversion means for receiving digital video signals reproduced from said memory playback means and converting same to analog video signals before applying same to said video receiver.

5. A system in accordance with claim 1 including character signal generating means connected to said computer and control means for controlling said character signal generating means for controlling same to generate selected alpha-numeric character signals, said computer being operable to apply said character signals generated to said erasable memory to record said character signals in said memory in a manner to cause selected characters to be generated on said display screen.

6. A system in accordance with claim 5 wherein said character signal generating means includes a manual keyboard for generating selected character signals when the keys thereof are selectively activated.

7. A system in accordance with claim 1 including human operated means connected to said digital computer for generating display control signals for causing said computer to selectively control the display of image information applied to said display means.

8. A system in accordance with claim 1 wherein said record member contains recordings of display control signals which are operable to be reproduced at selected times during the operating of said record playback means, means for feeding said control signals to said digital computer to cause said digital computer to control the display of video information on said display screen.

9. A system in accordance with claim 1 including manually controlled interaction means for use by a person viewing said display screen to change image information displayed on said display screen, said manually controlled interaction means being operable to generate variable control signals when manually operated and to apply same to said digital computer in changing the image displayed on said display screen.

10. A system in accordance with claim 9 wherein said manually controlled interaction means comprises a light pen.

11. A system in accordance with claim 10 including a record member having a plurality of different control codes recorded thereon which are selectively readable by said light pen for generating selected video control signals, and means for applying the signals generated by said light pen to said computer for controlling said computer to effect the display of selected information on said display screen.

12. A system in accordance with claim 1 including a television camera for generating video picture signals of images in its scanning field and means controlled by said digital computer for recording information derived from at least one full frame scan of the image field of said television camera in said erasable memory for application to said video receiver and for varying the image displayed on the display screen thereof.

13. A system in accordance with claim 1 wherein said record member contains a series of full-frame video picture signals recorded thereon and wherein said means for reading said full frame video recordings is operable to read said frame recordings sequentially to permit the frame video picture signals generated to be applied to said erasable memory and to be applied by said erasable memory a frame at a time to said means for generating a sequence of still images on said viewing screen which are viewable as respective still images by a person looking at said viewing screen, said audio recordings being recorded on said record member and reproducable therefrom as said video recordings are read in a manner to generate a series of words of speech on the output of said audio transducing means.

14. A system in accordance with claim 13 wherein certain of said full-frame video recordings define graphical representations of an animated cartoon and means for operating said record playback means in a manner to reproduce said video recordings and present them to said erasable memory to provide the visual effect of an animated cartoon to a person viewing said viewing screen of said video receiver.

15. A method of generating audio-visual effects on a video display viewing screen comprising:
 (a) computer controlling the operation of a record playback apparatus to selectively generate a plurality of first video display control signals provided in a record member,
 (b) computer controlling the recording of said first video display control signals in an erasable memory,
 (c) addressing said erasable memory at a fixed frequency to repeatedly generate and apply video display control signals recorded therein to a video display having a low image retention persistency to control the image generating means of said video display to generate a still image on its display screen,
 (d) thereafter controlling the operation of said record playback apparatus to cause it to generate a plurality of second video display control signals and applying said second video display control signals to said erasable memory to modify or replace the first video display control signals recorded in said erasable memory with said second video display control signals,
 (e) therafter controlling the operation of said erasable memory to generate and apply the video signals derived from said memory to said video display to generate and retain a second still image on its viewing screen which second still image has an image content which is different from that of the first still image displayed thereon, and
 (f) repeating steps (d) and (e) a number of times thereafter with respect to other video control signals recorded on said record member of said record playback apparatus.

16. A method in accordance with claim 15 which includes operating said record playback apparatus continuously and reproducing audio signals therefrom as said record playback apparatus operates and reproduces video display control signals and directly applying said audio signals to a transducer to transduce same to sounds as the video display generates still image on its display screen.

17. A method in accordance with claim 15 which includes manually operating a display control means in a manner to effect selected changes in one or more of the images displayed on said display screen.

18. A method in accordance with claim 17 wherein said display controller comprises a light pen which is operated to vary the signals recorded in said erasable memory to effect such selected changes in said images displayed on said display screen.

19. A method in accordance with claim 15 wherein said record playback apparatus operates continuously to reproduce video signals from said record member, further including operating a manual controller as said playback apparatus operates to selectively vary the content of signals applied to said video display to vary the information displayed by said display.

20. A method in accordance with claim 15 wherein said record playback apparatus operates intermittently to reproduce video signals from said record member, further including manually controlling said record playback apparatus to reproduce selected video display control signals recorded in said record member.

* * * * *